(12) United States Patent
Qiu et al.

(10) Patent No.: US 8,228,049 B2
(45) Date of Patent: Jul. 24, 2012

(54) ADVANCED PHASE NUMBER CONTROL FOR MULTIPHASE CONVERTERS

(75) Inventors: Weihong Qiu, San Jose, CA (US); Bogdan Duduman, Raleigh, NC (US); Jason Lin, San Chun (TW); Michael Jason Houston, Cary, NC (US); Doug Mattingly, Bahama, NC (US)

(73) Assignee: Intersil Americas LLC, Milpitas, CA (US)

( * ) Notice: Subject to any disclaimer, the term of this patent is extended or adjusted under 35 U.S.C. 154(b) by 444 days.

(21) Appl. No.: 12/501,204

(22) Filed: Jul. 10, 2009

(65) Prior Publication Data
US 2010/0066319 A1  Mar. 18, 2010

Related U.S. Application Data

(60) Provisional application No. 61/080,380, filed on Jul. 14, 2008.

(51) Int. Cl.
*G05F 1/575* (2006.01)
*G05F 1/59* (2006.01)

(52) U.S. Cl. .................................. 323/272; 323/284
(58) Field of Classification Search .............. 323/225, 323/271, 272, 284, 350, 282, 285
See application file for complete search history.

(56) References Cited

U.S. PATENT DOCUMENTS

| | | | |
|---|---|---|---|
| 7,327,128 B2 * | 2/2008 | Dinh | 323/272 |
| 7,609,040 B1 * | 10/2009 | Jain | 323/283 |
| 7,782,035 B2 * | 8/2010 | Cheung et al. | 323/282 |
| 7,812,581 B2 * | 10/2010 | Qiu et al. | 323/272 |

* cited by examiner

*Primary Examiner* — Gary L Laxton
*(74) Attorney, Agent, or Firm* — Howison & Arnott, L.L.P.

(57) ABSTRACT

A control circuit for generating a control signal to add phases to a multiphase voltage regulator. The control circuit includes an input for receiving an error correction voltage from an error amplifier of the multiphase voltage regulator and at least one output for providing a PWM control signal. Control circuitry generates at least one PWM control signal to add a phase to the multiphase voltage regulator responsive to a determination that the error correction voltage has exceeded a threshold level.

17 Claims, 9 Drawing Sheets

ADVANCED PHASE NUMBER CONTROL FOR MULTIPHASE CONVERTERS

CROSS REFERENCE TO RELATED APPLICATION

This application claims the benefit of U.S. Provisional Application for Patent Ser. No. 61/080,380 filed Jul. 14, 2008 and entitled ADVANCED PHASE NUMBER CONTROL FOR IMPROVED EFFICIENCY AND FAST TRANSIENT RESPONSE IN MULTIPHASE CONVERTER APPLICATIONS, the specification of which is incorporated herein by reference in its entirety.

BRIEF DESCRIPTION OF THE DRAWINGS

For a more complete understanding, reference is now made to the following description taken in conjunction with the accompanying Drawings in which.

DETAILED DESCRIPTION

Figure 1:
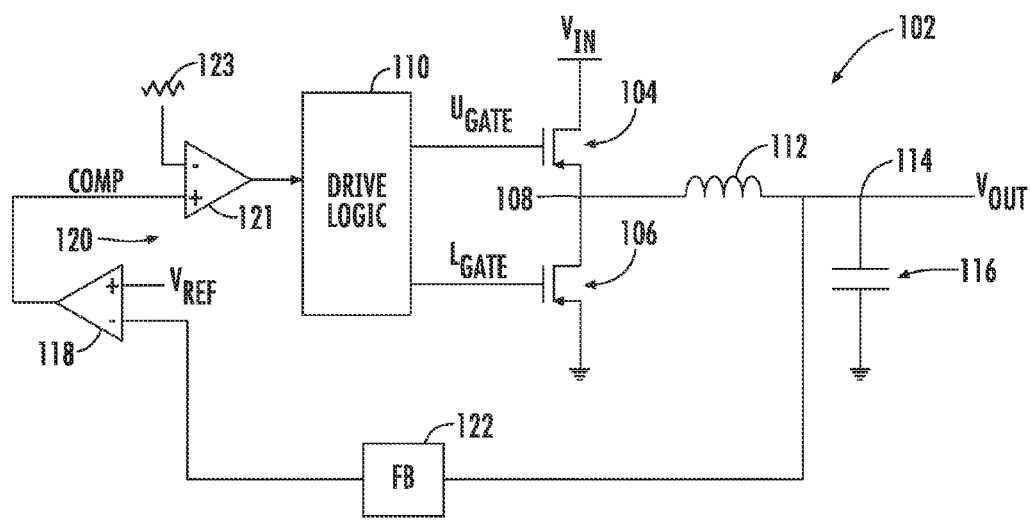
FIG. 1 is a schematic block diagram of a buck regulator.

Referring now to the drawings, wherein like reference numbers are used herein to designate like elements throughout, the various views and embodiments of an advanced phase number control for multiphase converters are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a schematic block diagram of a standard single phase buck converter 102. A pair of transistor switches 104 and 106 are connected in series between the input voltage node $V_{IN}$ and ground. The source of transistor switch 104 is connected to the drain of transistor switch 106 at the phase node 108. The upper transistor switch 104 has its drain coupled to the input voltage node $V_{IN}$ and its gate is receiving a control signal from the drive logic 110. The source of transistor switch 104 is coupled to the drain of the lower transistor switch 106 at the phase node 108. The lower transistor switch 106 has its drain coupled to the phase node 108 and receives a lower gate control signal from the drive logic 110. The phase node 108 is coupled through an output inductor 112 connected between the phase node 108 and the output voltage node $V_{OUT}$ 114. A capacitor 116 is connected between node 114 and ground.

The control circuitry for the switching transistors 104 and 106 include an error amplifier 118, PWM logic 120 and the drive logic 110. In typical configurations, the error amplifier 118 senses the output voltage $V_{OUT}$ using some type of voltage feedback sensing circuitry 122. Responsive to the sensed output voltage and a reference voltage $V_{REF}$, the error amplifier 118 generates a compensation signal COMP that is provided at its output to the PWM logic 120. The sensed feedback voltage from the output node 114 is provided to the inverting input of the error amplifier 118. The PWM logic 120 comprises a PWM comparator 121 that compares the error voltage signal $V_{COMP}$ applied to the non-inverting input of PWM comparator 121 with a reference ramp voltage 123 from an oscillator that is applied to the inverting input of the PWM comparator 121. The output of the PWM comparator 121 is applied to the driver circuitry 110. This process provides a pulse width modulated waveform with an amplitude of $V_{IN}$ at the phase node 108. The PWM waveform provided from phase node 108 is smoothed by an output filter consisting of inductor 112 and capacitor 116.

Based on the PWM signal, the drive logic 110 asserts the UGATE signal to a logical "high" to turn on the switching transistor 104 and asserts the LGATE signal to a logical "low" to turn off the switching transistor 106 to couple the input voltage $V_{IN}$ through the output inductor L to drive the voltage level of $V_{OUT}$. The drive logic 110 asserts the UGATE signal to a logical "low" and the LGATE signal to a logical "high" to turn off transistor 104 and turn on transistor 106. The operation toggles in this manner based on the duty cycle of the PWM signal provided by the PWM logic 120.

Figure 2:
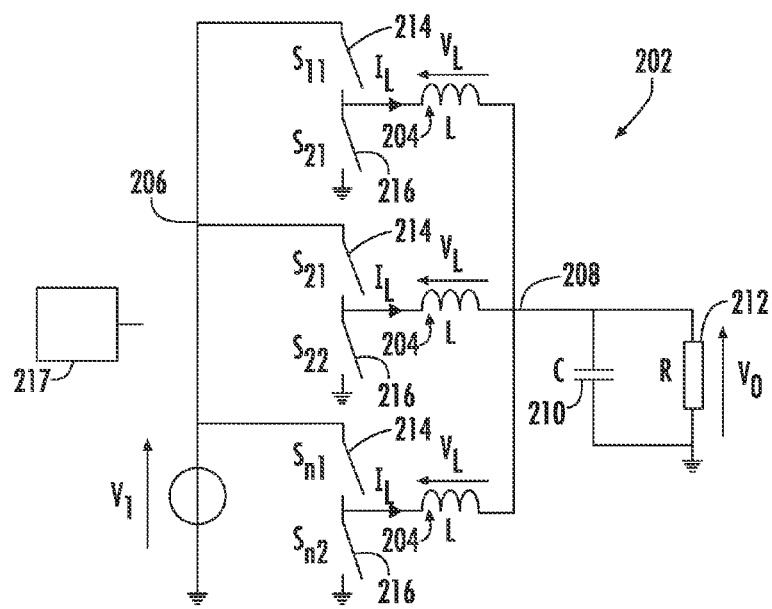
FIG. 2 illustrates a multiphase buck regulator converter.

Referring now to FIG. 2, within a multiphase converter circuit as illustrated at 202, multiple inductors 204 are connected between the input voltage node 206 and a phase node 208. A capacitor 210 and a resistor 212 are connected in parallel between node 208 and ground. Each inductor 204 has a pair of switching transistors associated therewith. The upper gate switching transistor 214 and the lower gate switching transistor 216 operate in a manner similar to that discussed with respect to a signal phase buck converter as described herein above with respect to FIG. 1. The transistors 214 and 216 are operated responsive to switching control signals from multiphase control logic 217.

The multiphase converter 202 is a circuit topology wherein the basic buck converter circuits are placed in parallel between the input and the load. Each of these "phases" is turned on at equally spaced intervals over the switching period. The circuit is typically used with an asynchronous buck topology. The primary advantage of this type of converter is that the load current is split among the end phases of the multiphase converter. This load splitting enables the heat losses on each of the switches to be spread across a larger area. Another important advantage provided by the multiphase configuration is that the output ripple is divided by the number of phases N. The load then experiences a ripple frequency which is N times the switching frequency. The multiphase topology provides an additional benefit in that system response to dynamic changes in the load current can be improved. Large increases in load current can be addressed by turning on additional phases as necessary.

In multiphase buck converters, the efficiency may not be maximized with all phases running under different load current levels. In order to achieve better efficiencies, it is necessary to adjust the number of running phases based upon the present load current. Under light load conditions, the running phase number is reduced to produce less driver and switching losses, resulting in improved efficiency. The traditional scheme is to monitor the load current by sensing the output inductor current to determine the optimal phase number under different load conditions. This works well for applications with slow transient responses. However, in CPU voltage regulator applications, the load current may jump from 10 amps to 100 amps in 100 nanoseconds. When only one phase is running at a 10 amp load, the transient response is much worse if no other phases are quickly added back to handle the transient current in an expedited fashion. Thus, it is not sufficient to control the number of phases within a multiphase converter based only upon the sensed inductor current. There is a need to be able to drop and add the number of phases quickly within a multiphase converter such that the converter may more adequately respond to fast transient responses within the regulator. This is due to the fact that during a fast transient event, the load current may jump very high in a short period of time while the inductor current will ramp-up slowly resulting in a huge difference between the load current and the inductor current. This will require a smaller number of phases under like load conditions to handle the step load current change initially. This will require the initial transient response to be much worse due to the smaller number of running phases when the addition of phases is based solely upon the sensed inductor current.

Figure 3:
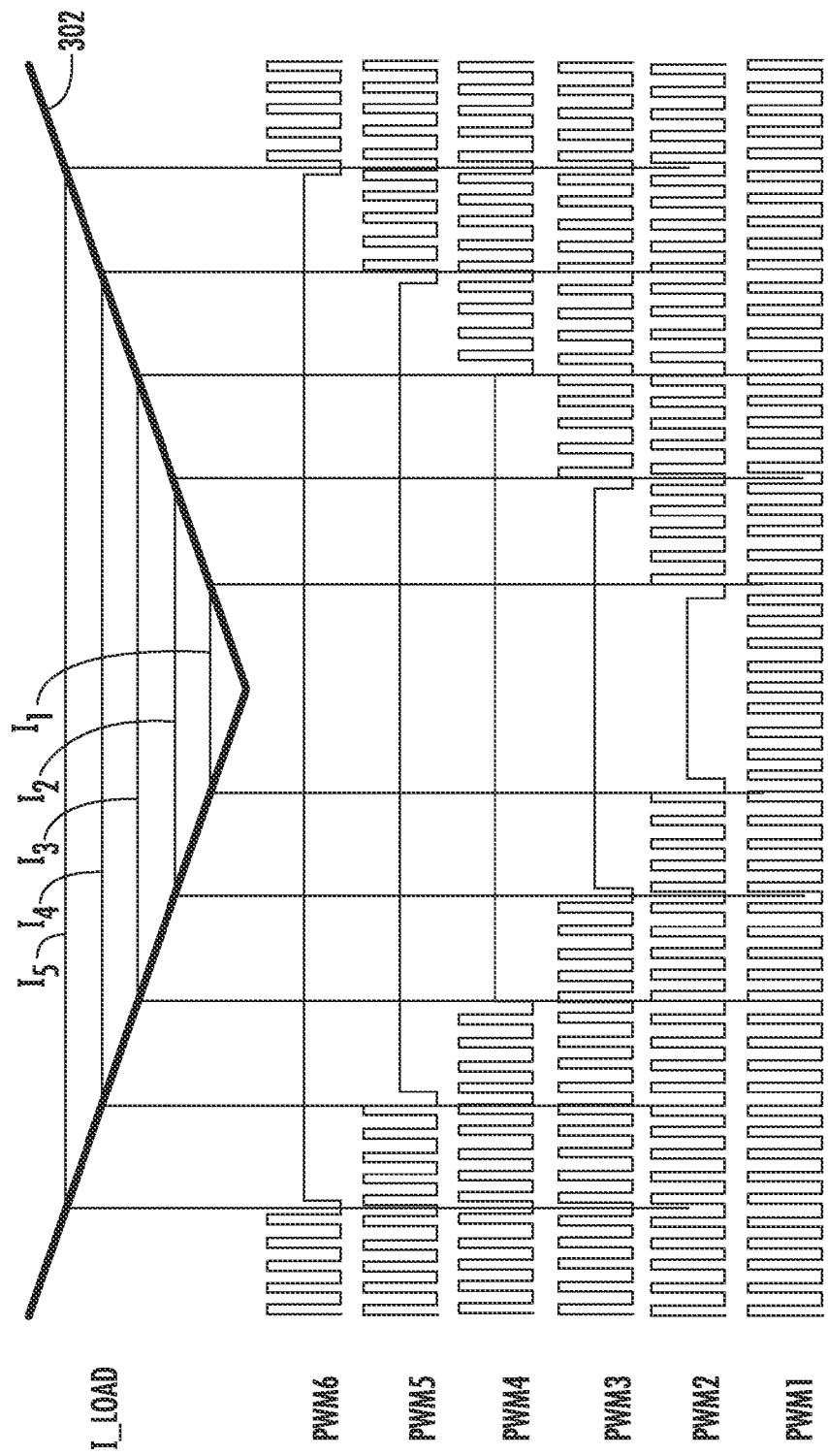
FIG. 3 illustrates the manner in which the number of phases may be controlled based upon a load current.

Referring now to FIG. 3, there is indicated the manner in which the load current $I_L$ 302 may be used to control the number of phases that are provided within a multiphase converter. As can be seen, at the load level $I_1$ only a single phase PWM1 is provided. Likewise, at load level $I_2$ the PWM1 and PWM2 phases are provided. As the load levels increase, the number of phases that are provided similarly increase until at above the $I_5$ current load level, each of the 6 PWM phases are utilized. In this manner, the optimal efficiency may be achieved over the entire load range by dynamically adjusting the number of phases according to the load current.

Figure 4:
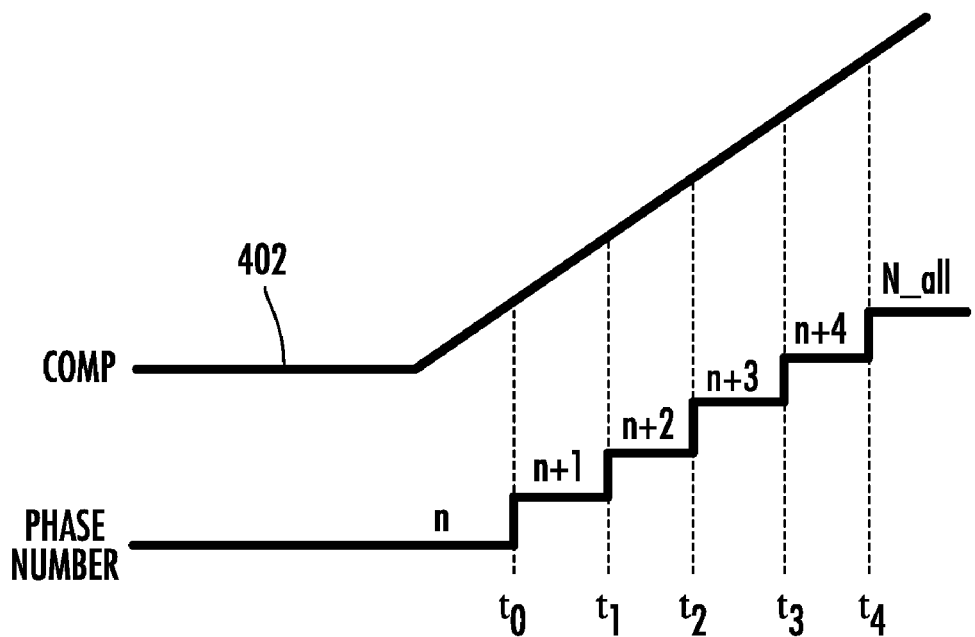
FIG. 4 illustrates the manner in which the number of phases may be controlled responsive to the COMP signal from the voltage error amplifier.

Referring now to FIG. 4, there is illustrated a manner for controlling the number of phases based upon the output of the error amplifier of the regulator rather than upon the load current $I_L$. This enables the system to be able to drop and add phases to a regulator quickly based upon the output voltage $V_{OUT}$ or the $V_{COMP}$ voltage of the error amplifier output. Based on the voltage step change magnitude and slew rate at the error amplifier output, one or more phases can be added back in a relatively rapid manner to handle the transient response in, for example, CPU VR applications. If load currents drop rapidly, one or more phases can be dropped in one step to further improve efficiencies. Within VR controllers, phases are often dropped to include the operating efficiency in the low power state. During a fast transient event, the output voltage will drop quickly due to ESL and ESR of the output capacitors, and the error amplifier output COMP signal 402 will increase to a high level.

The proposed phase number control scheme will add phases back into the system based upon the deviation of the COMP signal 402. There will be multiple levels to add phases on a one by one basis. Thus, at time $T_0$ when the COMP signal has begun to increase to the indicated level, a single phase number is added back to the total number of phases. As the COMP signal 402 continues to increase from time $T_0$ to time $T_1$, a second phase is added back at time $T_1$. Similarly, by the COMP signal 402 continues to increase from time $T_1$ to time $T_4$, the phases are added at each of the COMP voltage levels that are associated with the addition of a further phase until all of the phases have been placed back in operation at time $T_4$.

Figure 5:
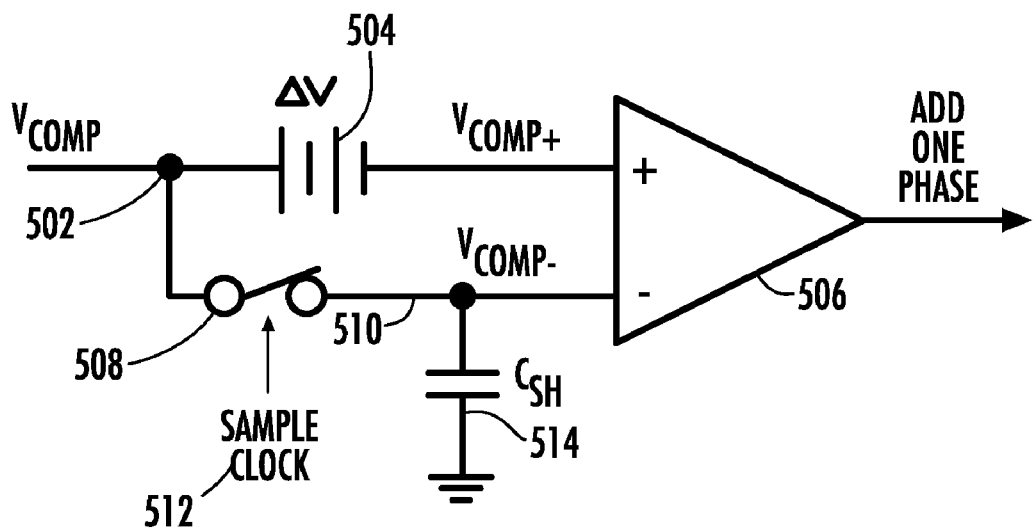
FIG. 5 is a schematic diagram of a first control circuit for controlling a number of phases based upon the $V_{COMP}$ voltage of the error amplifier.

Referring now to FIG. 5, there is illustrated a first embodiment of circuitry for generating control signals to the multiphase controller 217 to add phases to and remove phases from a multiphase converter responsive to the error amplifier voltage $V_{COMP}$. The error amplifier output voltage $V_{COMP}$ is provided to a node 502. An offset voltage source 504 is connected between node 502 and a non-inverting input of comparator 506. A sampling switch 508 is connected between node 502 and node 510. Node 510 is connected to the inverting input of the comparator 506. The sampling switch 508 is controlled responsive to a sampling clock signal 512. A capacitor 514 is connected between node 510 and ground. The output of the comparator 506 provides a control signal for providing an indication to add a phase within the multiphase controller.

The error amplifier voltage $V_{COMP}$ is sampled by switch 508 at its peak value on the rising edge of each PWM signal of every active phase. If the $V_{COMP}$ voltage is higher than the sum of the $V_{COMP}$ voltage received at node 502 and the $\Delta V$ offset voltage applied from voltage source 504, a phase will be added by the multiphase regulator responsive to the output of the comparator 506 going to a logical "high" level. The error amplifier voltage $V_{COMP}$ at node 502 is again sampled by switch 508 to adjust threshold voltage for a next triggering. If the error amplifier voltage $V_{COMP}$ continues to increase and reaches the updated threshold a further phase is added responsive to the output of the comparator 506 again going to a logical "high" level.

Figure 6:
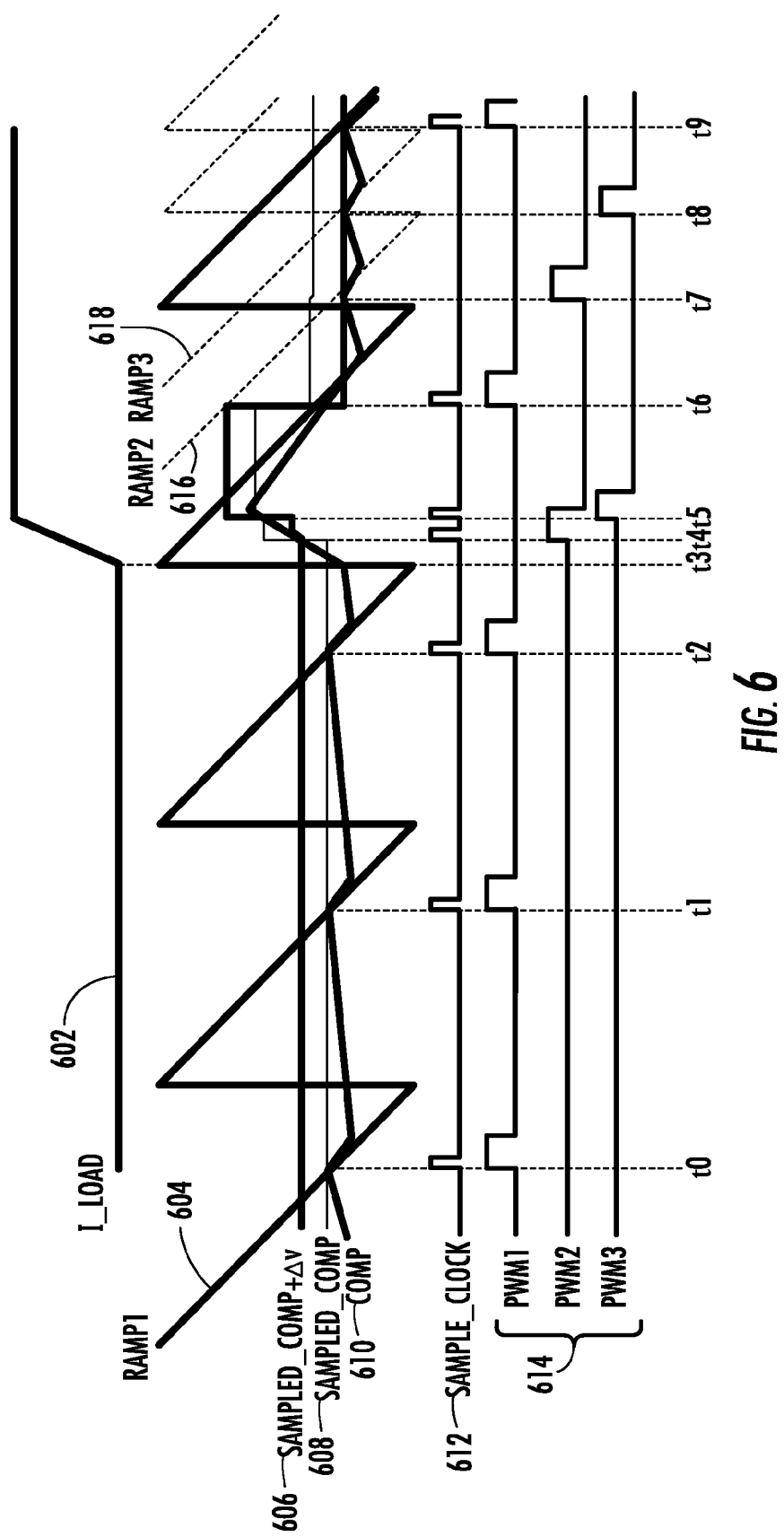
FIG. 6 illustrates the waveforms associated with the operation of the control circuitry of FIG. 5.

Referring now to FIG. 6, there are illustrated the various waveforms associated with the operation of the circuitry of FIG. 5. The $I_{LOAD}$ signal 602 represents the load current through the inductor of the buck regulator. The RAMP1 signal 604 comprises the ramp signal applied in the PWM logic to generate the PWM control signal. The sampled_$V_{COMP}$+$\Delta V$ signal 606 illustrates the voltage applied to the non-inverting input of the comparator 506. The sampled_COMP signal 608 indicates the $V_{COMP}$ voltage sampled by the sampling switch 508. The COMP signal 610 comprises the $V_{COMP}$ error voltage that is being applied at node 502. The sample_clock signal 612 which controls the sampling switch 508 includes a sampling clock pulse at each rising edge of a PWM signal. PWM1 through PWM3 illustrate various PWM phase signals 614 that may be added to the multiphase regulator responsive to the monitored $V_{COMP}$ signal 610.

As can be seen at time $T_0$ only a single phase signal PWM1 614 is being utilized due to the low error voltage signal 610. When the PWM1 pulse goes high at time $T_0$, this creates a sample clock 612 pulse at $T_0$ which locks the sampled_comp signal 608 at the level of the $V_{COMP}$ signal 610. Since the sampled_comp signal 608 is lower than the sampled_comp+$\Delta V$ signal 606 at time $T_0$, no additional phases must be added. Similar results are achieved at times $T_1$ and $T_2$. When the $V_{COMP}$ signal 610 jumps above the sampled_comp+$\Delta V$ signal 606 at time $T_4$, an additional phase PWM2 signal 614 is initiated at time $T_4$. Additionally at time $T_4$ due to the increased COMP signal 610, the sampled_comp+$\Delta V$ signal is updated to a higher level at time $T_4$ to prepare for monitoring for the need to add a next phase. At time $T_5$, the COMP voltage signal 610 has continued to increase and reaches the new threshold level at time $T_5$ causing a next phase PWM3 signal 614 to be turned on, and the threshold signal 606

(sampled_comp+ΔV) is again updated to a new level. The PWM2 and PWM3 phase signals 614 are generated at times $T_7$ and $T_8$ respectively responsive to their own down ramps 616 and 618 which are generated responsive to the actuation of the phases by the PWM logic associated with these phases.

Figure 7:
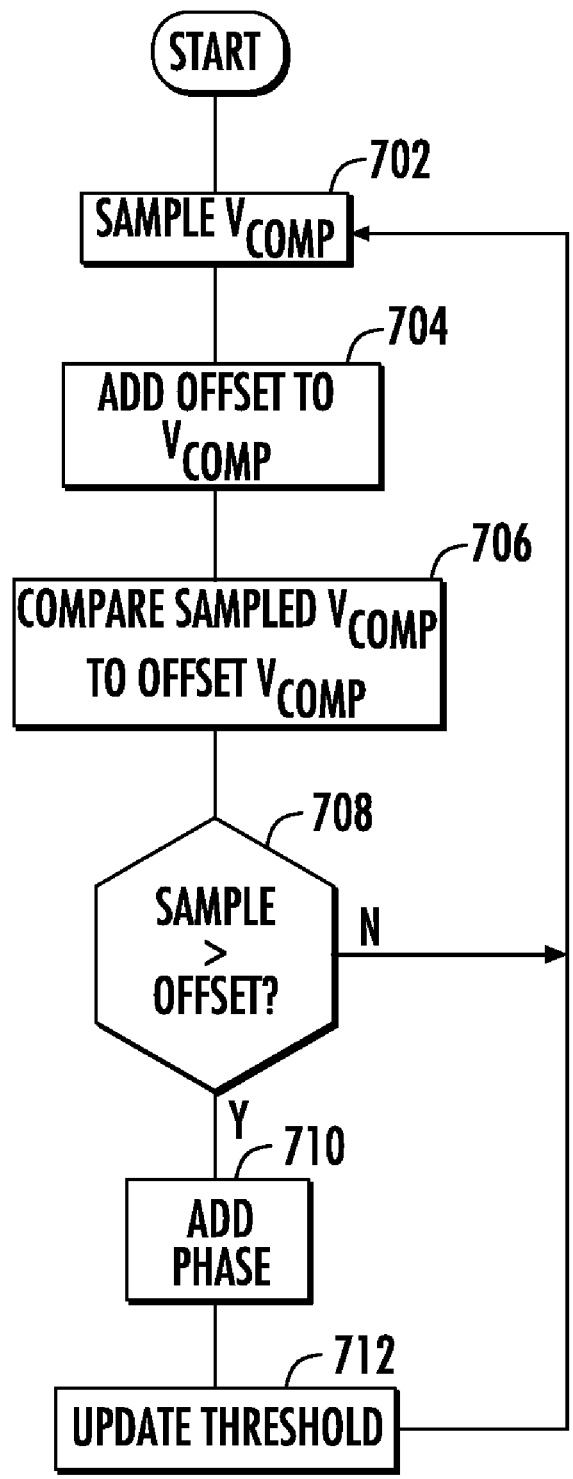
FIG. 7 is a flow diagram describing the operation of the circuitry of FIG. 5.

Referring now to FIG. 7, there is illustrated a flow diagram describing the operation of the circuitry of FIG. 5. Once the operation of circuitry is initiated, the error voltage $V_{COMP}$ is sampled at step 702 by the sampling switch 508. The threshold voltage including the sampled $V_{COMP}$ voltage with the voltage offset ΔV is determined at step 704. The threshold signal including the offset $V_{COMP}$ and the sampled $V_{COMP}$ are compared at step 706 such that inquiry step 708 may determine whether the sampled voltage is greater than the threshold offset voltage. If not, control passes back to step 702. If inquiry step 708 determines that the sampled voltage is greater than the offset threshold, an additional phase is added to the multiphase converter at step 710, and the threshold offset $V_{COMP}$+ΔV is updated at step 712 such that the $V_{COMP}$ voltage may be compared with the new threshold level during the next iteration to determine if an additional phase is necessary.

Figure 8:
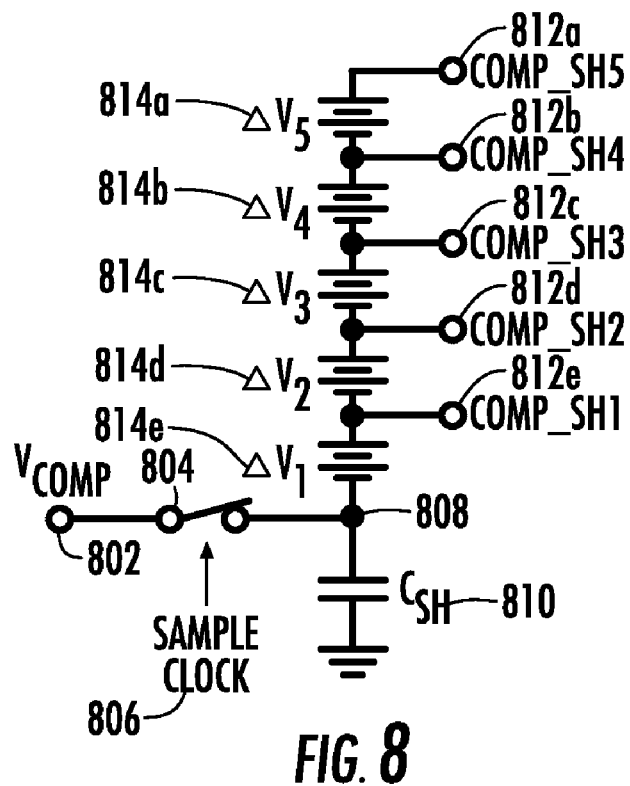
FIG. 8 illustrates a second embodiment of circuitry for generating a control signal responsive to the $V_{COMP}$ voltage of the error amplifier.
Figure 9:
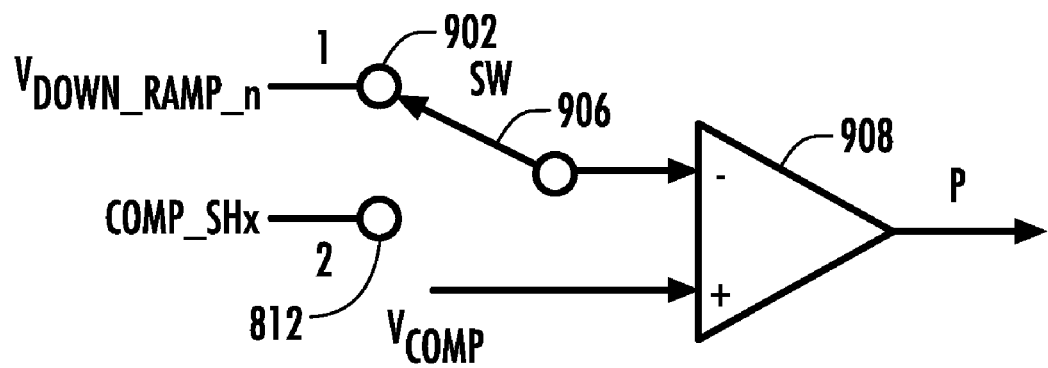
FIG. 9 illustrates further circuitry of the second embodiment of generating the number of phases responsive to the $V_{COMP}$ voltage of the error amplifier.

Referring now to FIGS. 8 and 9, there are illustrated an alternative embodiment for the control circuitry for adding phases to the multiphase regulator responsive to monitoring of the error amplifier voltage. FIG. 8 illustrates that the error voltage $V_{COMP}$ is applied at node 802. A sampling switch 804 samples the error voltage $V_{COMP}$ responsive to a sample clock signal 806. The sample clock signal 806 causes the error voltage $V_{COMP}$ to be sampled at its peak value on the rising edge of each PWM pulse signal of every phase. The sampling switch 804 is connected between nodes 802 and 808. A capacitor 810 is connected between node 808 and ground. Connected between node 808 and nodes 812a-812e are a series of offset voltages 814.

Each of the nodes 812 are associated with an inverting input of the down ramp comparator 908 of a dropped phase. The down ramp comparator 908 corresponds with the comparator 121 described previously with respect to FIG. 1. The non-inverting input of the down ramp comparator 908 is connected to receive the error voltage $V_{COMP}$. The inverting input of the down ramp comparator 908 is connected with a switch 906. The switch selects between the ramp signal applied to the down ramp comparator 908 at node 902 and the offset threshold ($V_{COMP}$+ΔV) at node 812 provided from the circuitry of FIG. 8. The circuitry of FIG. 9 would comprise multiple iterations, each associated with one of the outputs 812 providing the threshold offset from the circuitry of FIG. 8. The switch 906 connects with node 902 when the phase associated with the comparator 908 is running, and the ramp signal is driving the phase associated with the comparator 908. When the phase is not running, the switch 906 connects the inverting input with node 812 such that the offset threshold voltage is able to be compared with the $V_{COMP}$ error voltage. When the comparator 908 determines that the $V_{COMP}$ voltage exceeds the threshold offset voltage, the switch 906 is connected to the ramp voltage provided at node 902 to initiate activation of the phase. The first pulse provided for the phase is generated responsive to the output of the comparator 908 going to a logical "high" level when the COMP voltage exceeds the offset threshold the remaining phases are controlled by the ramp voltage.

Figure 10:
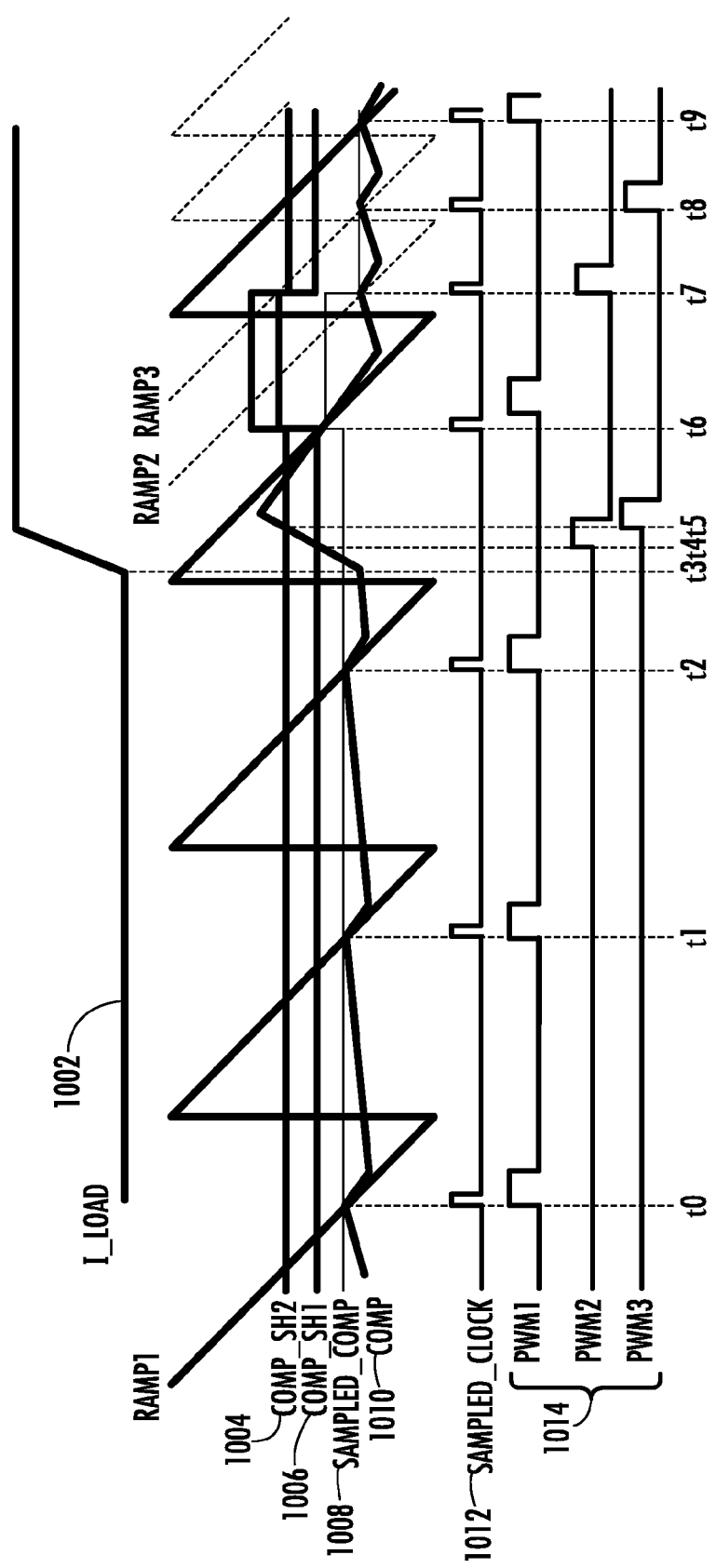
FIG. 10 illustrates the waveforms associated with the circuitries of FIGS. 8 and 9.

Referring now to FIG. 10, there are illustrated the waveforms associated with the operation of the circuitry of FIGS. 8 and 9. The load current 1002 can be seen to remain at a relatively low level until it begins increasing at time $T_3$. The COMP_SH2 signal 1004 represents the output of the down ramp comparator associated with one phase of the multiphase regulator. The COMP_SH1 signal 1006 is associated with the down ramp comparator of a second phase. The sampled COMP signal 1008 comprises the voltage that is sampled at the sampling switch 804. The COMP error voltage signal 1010 represents the $V_{COMP}$ voltage input at node 802. The sample_clock 1012 represents the control signal applied to this switch 804 that provides a pulse on each rising edge of a PWM pulse of one of the phase signals. The sample_clock signal 1012 is generated only on the rising edge of one of the PWM pulses within one of the phase signals 1014. The COMP signal 1010 is sampled responsive to the sample clock signal.

When sampled at times $T_0$ through $T_2$, the sample_comp signal 1008 remains at the same level as the $V_{COMP}$ voltage 1010 is not increasing above the COMP_SH1 signal 1006 or COMP_SH2 signal 1004. The COMP_SH1 signal 1006 is sent to the phase number 2 ramp down comparator 908, and the COMP_SH2 signal 1004 is sent to the phase 3 ramp down comparator 908. When the COMP error voltage signal 1010 jumps above the COMP_SH1 signal 1006 the PWM2 phase signal 1014 is immediately turned on at time $T_4$. When the COMP signal 1010 rises above the COMP_SH2 signal 1004 the PWM3 phase signal 1014 is turned on immediately at time $T_5$. After these times, the PWM2 and PWM3 phase signals 1014 are generated at $T_7$ and $T_8$ respectively by their own down ramps which are connected by the switch 906 once the down ramp comparator 908 indicates the $V_{COMP}$ voltage has exceeded the COMP_SHX threshold voltage.

Figure 11:
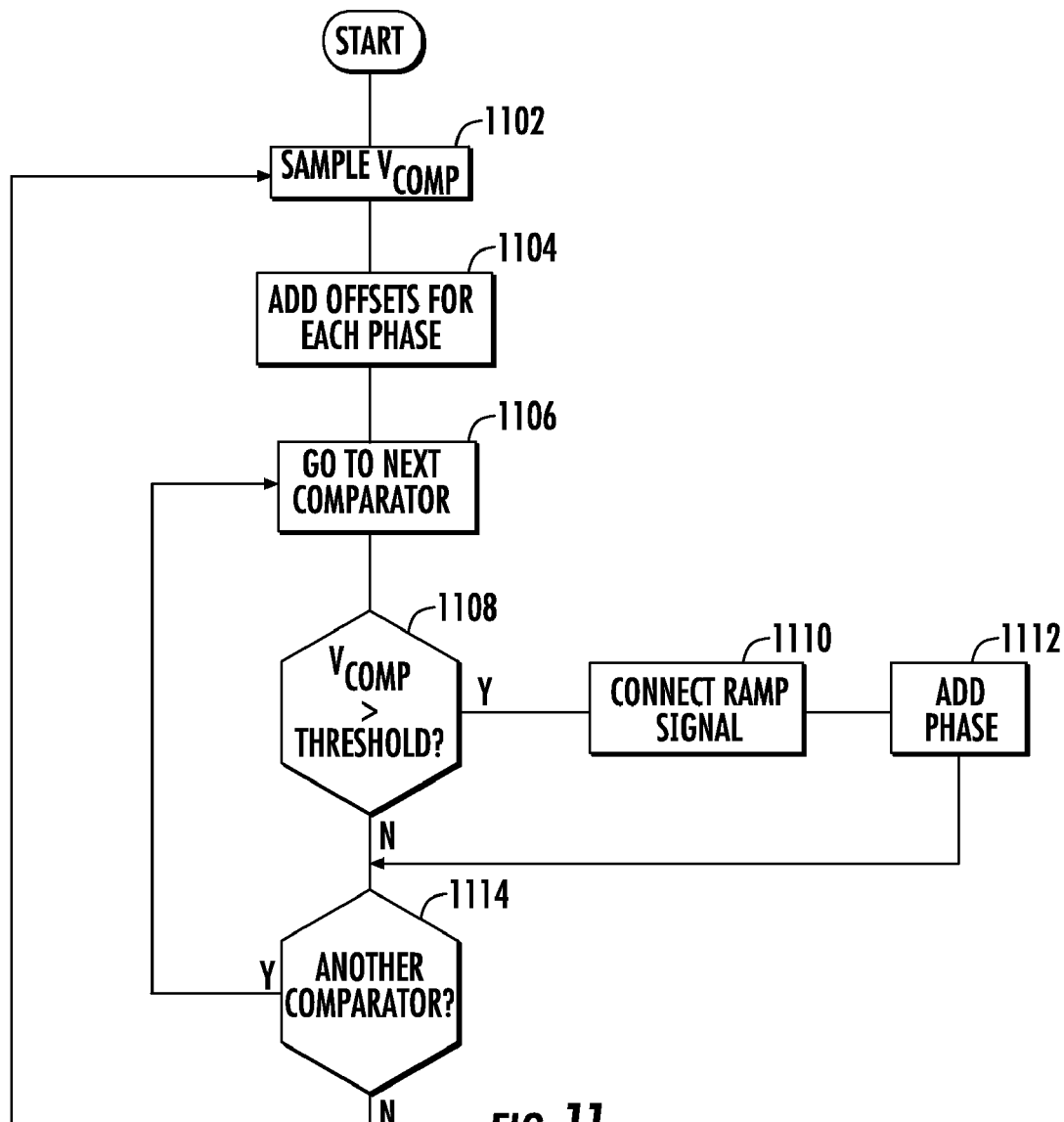
FIG. 11 is a flow diagram describing the operation of the circuitry of FIGS. 8 and 9.

Referring now to FIG. 11, there is illustrated a flow diagram describing the operation of the circuits of FIGS. 8 and 9. Once the process is initiated, the $V_{COMP}$ voltage is sampled at step 1102 by the sampling switch 906. The various ΔV offsets associated with each phase are added to the sampled signal at step 1104 and these threshold offset voltages are provided from the offset circuitry to the input of the down ramp comparator 908. A next down ramp comparator that is not presently associated with a running phase is selected at step 1106. Inquiry step 1108 determines whether the error voltage $V_{COMP}$ associated with the presently selected down ramp comparator 908 is greater than the offset threshold voltage applied to the comparator. If so, the ramp signal associated with the down ramp comparator is connected at step 1110 to the comparator instead of the threshold offset signal. This causes the phase to be turned on and added to the multiphase regulator at step 1112. If inquiry step 1108 determines that the error compensation voltage does not exceed the threshold offset voltage or once the new phase has been added, inquiry step 1114 determines whether there exists another down ramp comparator 908. If so, control passes back to step 1106 and the error voltage/threshold offset determination is repeated with respect to the new down ramp comparator. If no further down ramp comparators are present, control passes back to step 1102 where the error voltage may again be sampled.

Figure 12:
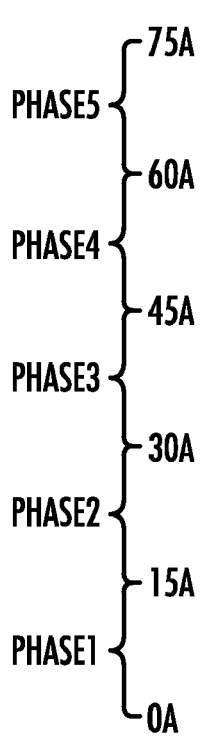
FIG. 12 illustrates an alternative method of phase control.

In an additional embodiment, the phase loading windows may be programmed into the controller IC during power up of the buck regulator circuitry. These windows determine the number of phases that a voltage regulator should be given in response to the average load current that is being sent by the circuitry. These windows are effectively stacked on top of one another and the transitions define the threshold for adding an additional phase or removing a phase. Thus, as illustrated in FIG. 12, five different phase windows are illustrated, each having a 15 amp window associated thereto. Thus, single phase operation is associated with currents between 0 to 15 amps. Two phase operation is associated with a current of 15-30 amps. Three phase operation is associated with a current of 30 to 45 amps. Four phase operation is associated with a current of 45 to 60 amps and five phase operation is associated with a current of 60 to 75 amps. Adding these additional phases or removing the phases occurs when a threshold level, either 15 amps, 30 amps, 45 amps, or 60 amps is passed. Once a threshold level is passed, the number of phases associated with the threshold level is then generated. Thus, when the average sensed load current is within a particular current window, the appropriate number of phases associated with that current window will be either added or removed sequentially after a set period of time after first entering the window.

Figure 13:
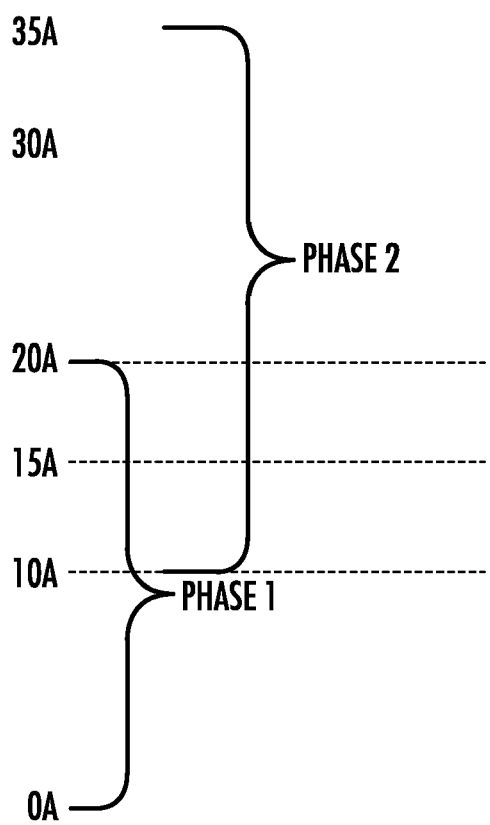
FIG. 13 illustrates the method of Claim 12 using hysteresis control.

Referring now to FIG. 13, there is illustrated a method for adding phases wherein in addition to the loading windows being programmed into the IC at power up, a hysteresis level is also established. The hysteresis level sets the current level that places the regulator into the next higher or lower loading window. Thus, the hysteresis level is placed on top of the falling threshold. For instance, continuing with the 15 amp loading window described previously with respect to FIG. 12, if a hysteresis level of 15 amps were established, the regulator currently within the lowest loading window of 0 to 15 amps would not enter the second loading window of 15 to 30 amps until a current level of 20 amps had been exceeded. Once the sensed load current has exceeded the rising threshold, the additional phase is immediately added. Similarly, in going from the two phase level to the one phase level, the load current would have to drop to a level of 10 amps, 5 amps below the 15 amp window level.

Figure 14:
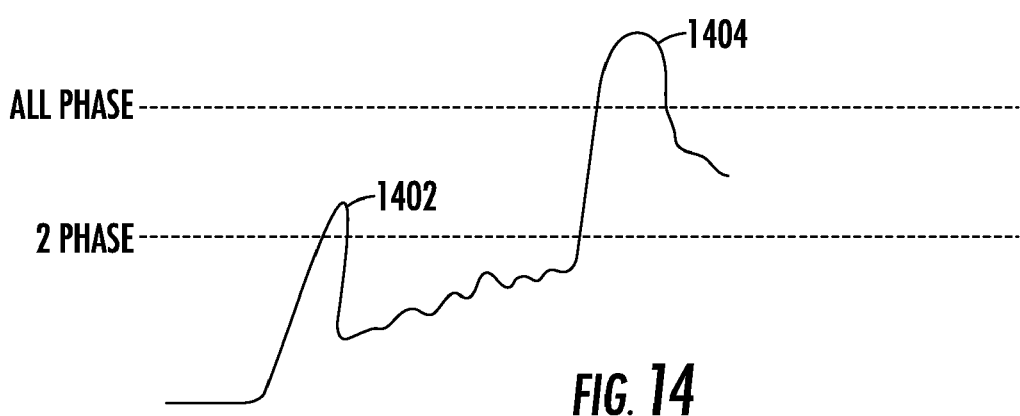
FIG. 14 illustrates a further method of phase control.

Referring now to FIG. 14, in an alternative embodiment for adding phases, at power up two different voltage levels are programmed into the controller. These voltage levels set two APA (adaptive phase alignment) trip levels. The output voltage is continuously monitored, and the APA will trip if a fast transient has caused the output to rapidly change and breach a threshold. Upon breaching the first threshold, two phases are immediately added to the circuitry. When the second threshold is breached, all of the remaining non-active phases are immediately added. Neither of these actions has any delay associated therewith. This is illustrated in FIG. 14 which shows transient 1402 rising only above the two phase level. When this occurs, the two additional phases would be immediately added. Similarly, when transient 1404 exceeded the all phase level, each of the non-active phases are added.

Using the above described implementations, phases within may be quickly added responsive to changes in the error compensation voltage. The added phase number is based upon the magnitude and slew rate of the COMP voltage only to meet the transient response.

It will be appreciated by those skilled in the art having the benefit of this disclosure that this disclosure provides an advanced phase number control for multiphase converters. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A multiphase voltage regulator, comprising:
    switching circuitry for generating an output voltage responsive to the input voltage;
    an error amplifier for generating an error correction voltage responsive to the output voltage and a reference voltage;
    PWM logic for generating a phase signal for each phase of the multiphase buck converter responsive to the error correction voltage and at least one ramp voltage;
    drive logic for generating control signals to the switching circuitry responsive to the phase signals; and
    control circuitry for generating at least one control signal to add a phase as an output of the PWM logic responsive to a determination that the error correction voltage has exceeded a threshold level.

2. The multiphase voltage regulator of claim 1, wherein the control circuitry further comprises:
    a sampling circuit for sampling the error correction voltage;
    a voltage source for providing a voltage offset to the error correction voltage to establish a threshold voltage; and
    a comparator for comparing the sampled error correction voltage with the threshold voltage, wherein the comparator generates the at least one control signal to add the phase to the output of the PWM logic when the sampled error correction voltage exceeds the threshold voltage.

3. The multiphase voltage regulator of claim 2, wherein the sampling circuit comprises a switch.

4. The multiphase voltage regulator of claim 1, wherein the control circuitry further comprises:
    a sampling circuit for sampling the error correction voltage;
    a plurality of voltage sources for providing a plurality of voltage offsets to the sampled error correction voltage to establish a plurality of threshold voltages;
    a plurality of comparators each associated with one phase of the multiphase voltage regulator having a first mode of operation wherein the comparator compares the error correction voltage with one of the plurality of threshold voltages when the phase associated with the comparator is not running and a second mode of operation wherein the comparator compares the error correction voltage with a ramp voltage associated with the phase when the phase associated with the comparator is running.

5. The multiphase buck converter of claim 4, wherein the control circuitry further comprises a switch for switching between the ramp voltage and the one of the plurality of threshold voltages, the switch switching from the one of the plurality of threshold voltages to the ramp voltage responsive to a determination by the comparator that the error correction voltage exceeds the one of the plurality of threshold voltages.

6. A control circuit for generating a control signal to add phases to a multiphase voltage regulator, comprising:
    an input for receiving an error correction voltage from an error amplifier of the multiphase voltage regulator;
    at least one output for providing a PWM control signal;
    control circuitry for generating at least one PWM control signal to add a phase to the multiphase voltage regulator responsive to a determination that the error correction voltage has exceeded a threshold level.

7. The control circuit of claim 6, wherein the control circuitry further comprises:
    a sampling circuit for sampling the error correction voltage;
    a voltage source for providing a voltage offset to the error correction voltage to establish a threshold voltage; and
    a comparator for comparing the sampled error correction voltage with the threshold voltage, wherein the comparator generates the at least one PWM control signal to add the phase to the multiphase voltage regulator when the sampled error correction voltage exceeds the threshold voltage.

8. The control circuit of claim 7, wherein the sampling circuit comprises a switch.

9. The control circuit of claim 6, wherein the control circuitry further comprises:
a sampling circuit for sampling the error correction voltage;
a plurality of voltage sources for providing a plurality of voltage offsets to the sampled error correction voltage to establish a plurality of threshold voltages;
a plurality of comparators each associated with one phase of the multiphase voltage regulator having a first mode of operation wherein the comparator compares the error correction voltage with one of the plurality of threshold voltages when the phase associated with the comparator is not running and a second mode of operation wherein the comparator compares the error correction voltage with a ramp voltage associated with the phase when the phase associated with the comparator is running.

10. The control circuit of claim 9, wherein the control circuitry further comprises a switch for switching between the ramp voltage and the one of the plurality of threshold voltages, the switch switching from the one of the plurality of threshold voltages to the ramp voltage responsive to a determination by the comparator that the error correction voltage exceeds the one of the plurality of threshold voltages.

11. A method for adding phases to a multiphase voltage regulator, comprising the steps of:
receiving an error correction voltage from an error amplifier of the multiphase voltage regulator;
determining whether the error correction voltage has exceeded a threshold voltage level;
generating at least one PWM control signal to add a phase to the multiphase voltage regulator responsive to a determination that the error correction voltage has exceeded the threshold level; and
providing the at least one PWM control signal to control operation of the multiphase voltage regulator.

12. The method of claim 11, wherein the step of determining further comprises the steps of:
sampling the error correction voltage;
adding a voltage offset to the error correction voltage to establish a threshold voltage; and
comparing the sampled error correction voltage with the threshold voltage.

13. The method of claim 12, wherein the step of generating further comprises the step of generating the at least one PWM control signal to add the phase to the multiphase voltage regulator when the sampled error correction voltage exceeds the threshold voltage.

14. The method of claim 12, wherein the step of sampling further comprises the step of switching a value of the error correction voltage to store a fixed value.

15. The method of claim 11, wherein the step of determining further comprises the steps of:
sampling the error correction voltage;
adding a plurality of voltage offsets to the sampled error correction voltage to establish a plurality of threshold voltages;
comparing the sampled error correction voltage with one of the plurality of threshold voltages for each comparator of a plurality of comparators in a first mode of operation when the phase associated with the comparator is not running; and
comparing the sampled error correction voltage with a ramp voltage for each comparator of the plurality of comparators in a second mode of operation when the phase associated with the comparator is running.

16. The method of claim 15 wherein the step of generating further comprises the step of generating the at least one PWM signal responsive to the comparisons to add the phase to the multiphase voltage regulator when the sampled error correction voltage exceeds the at least one threshold voltage.

17. The method of claim 15, further comprising the steps of:
determining whether the error correction voltage exceeds the one of the plurality of threshold voltages; and
switching between the ramp voltage and the one of the plurality of threshold voltages responsive to the determination of whether the error correction voltage exceeds the one of the plurality of threshold voltages.

* * * * *